US009559967B2

(12) United States Patent
Peck et al.

(10) Patent No.: US 9,559,967 B2
(45) Date of Patent: Jan. 31, 2017

(54) POLICY IMPLEMENTATION OVER LMR AND IP NETWORKS

(71) Applicant: TAIT LIMITED, Christchurch (NZ)

(72) Inventors: Geoffery Charles Peck, Clarkville (NZ); Clive Douglas Horn, Rolleston (NZ)

(73) Assignee: TAIT LIMITED, Christchurch (NZ)

( * ) Notice: Subject to any disclaimer, the term of this patent is extended or adjusted under 35 U.S.C. 154(b) by 0 days.

(21) Appl. No.: 14/725,922

(22) Filed: May 29, 2015

(65) Prior Publication Data

US 2015/0350090 A1 Dec. 3, 2015

(30) Foreign Application Priority Data

May 29, 2014 (NZ) ........................ 625717

(51) Int. Cl.
| | |
|---|---|
| *H04M 9/00* | (2006.01) |
| *H04L 12/813* | (2013.01) |
| *H04W 4/08* | (2009.01) |
| *H04W 4/22* | (2009.01) |
| *H04W 52/02* | (2009.01) |
| *H04W 88/06* | (2009.01) |

(52) U.S. Cl.
CPC ............... *H04L 47/20* (2013.01); *H04W 4/08* (2013.01); *H04W 4/22* (2013.01); *H04W 52/0225* (2013.01); *H04W 88/06* (2013.01); *Y02B 60/50* (2013.01)

(58) Field of Classification Search
CPC ..... H04W 12/08; H04W 84/042; H04W 76/02
USPC ... 455/524, 414.1, 519, 404.1, 452.2, 456.6, 455/450, 404.2; 370/329, 327, 328, 338; 342/457, 450
See application file for complete search history.

(56) References Cited

U.S. PATENT DOCUMENTS

| | | | |
|---|---|---|---|
| 7,676,380 | B2 | 3/2010 | Graves et al. |
| 7,707,044 | B2 | 4/2010 | Graves et al. |
| 7,801,743 | B2 | 9/2010 | Graves et al. |
| 7,966,008 | B2 | 6/2011 | Graves et al. |
| 8,050,939 | B2 | 11/2011 | Graves et al. |
| 8,145,262 | B2 * | 3/2012 | Martinez ............... H04W 88/06 370/328 |
| 8,180,650 | B2 | 5/2012 | Graves et al. |
| 8,285,344 | B2 | 10/2012 | Kahn et al. |
| 8,504,066 | B1 | 8/2013 | Green et al. |
| 8,526,932 | B2 | 9/2013 | Tofighbakhsh et al. |
| 8,571,276 | B2 | 10/2013 | Vitt et al. |
| 8,577,385 | B2 | 11/2013 | Marocchi et al. |
| 8,699,764 | B2 | 4/2014 | Vitt et al. |
| 8,700,102 | B2 | 4/2014 | Ferren et al. |
| 8,837,906 | B2 | 9/2014 | May et al. |
| 8,903,657 | B2 | 12/2014 | Bekiares et al. |
| 8,982,783 | B2 | 3/2015 | Miller et al. |

(Continued)

OTHER PUBLICATIONS

Zephyr PSM Responder Brochure, 2010; 2 pages.

*Primary Examiner* — Kiet Doan
(74) *Attorney, Agent, or Firm* — Peter Su; Dentons US LLP

(57) ABSTRACT

A communication system is made up of a number of LMR and IP bearers including LTE and P25. The information flowing over the integrated system is managed according to the situational context of the user. A policy driven approach is described that uses user context as its inputs and converts this into actions that preferentially improves the communication for the user particularly as they move between the available networks.

11 Claims, 18 Drawing Sheets

(56) References Cited

U.S. PATENT DOCUMENTS

Figure 1:
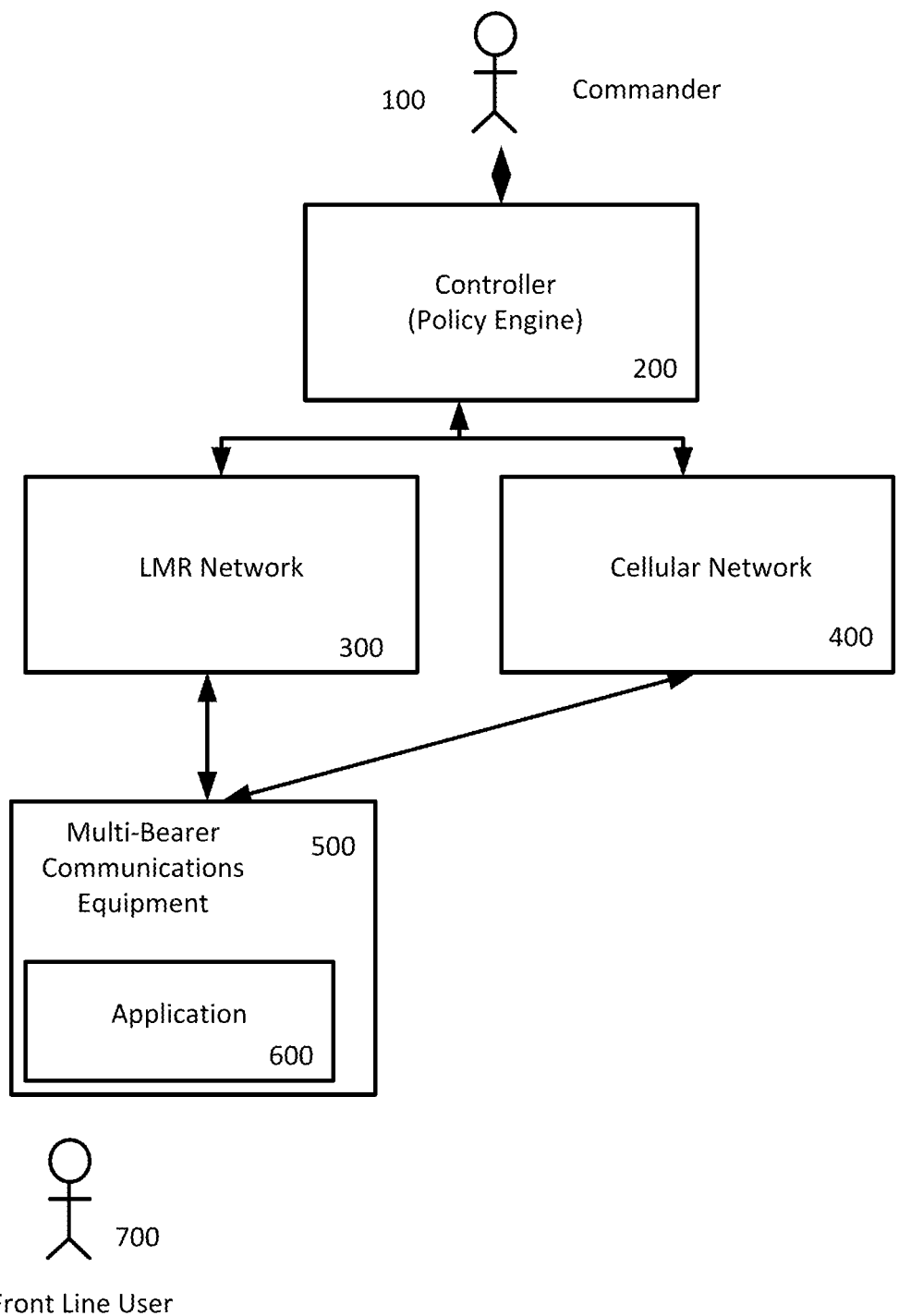

| | | |
|---|---|---|
| 8,989,694 B2 | 3/2015 | Ventulett et al. |
| 8,989,740 B2 | 3/2015 | Economy et al. |
| 8,990,381 B2 | 3/2015 | Patel |
| 9,008,020 B2 | 4/2015 | Yacobi et al. |
| 2006/0105817 A1 | 5/2006 | Naick et al. |
| 2008/0095097 A1 | 4/2008 | Mehta |
| 2009/0113516 A1 | 4/2009 | Vorreiter et al. |
| 2013/0010718 A1 | 1/2013 | Horn |
| 2014/0038668 A1 | 2/2014 | Vasavada et al. |
| 2014/0244648 A1* | 8/2014 | Wyatt ............... G06F 17/30867 707/737 |

* cited by examiner

Rule : If the front line user is running then present critical information via audio interface rather than screen.

Rule: If the front line user has access to LMR then for all calls, prefer that communication path.

POLICY IMPLEMENTATION OVER LMR AND IP NETWORKS

FIELD OF THE INVENTION

This invention relates to communication systems having multiple bearers, such as LMR and IP networks in an overlapping geographical area, providing services to mobile terminals. These are used by groups for which reliability, resilience and operational procedure are normal for performing their job. Examples include public safety, utilities, transport and extractive industries who during the course of their work undertake certain tasks which may be described in part or in full as workflows

BACKGROUND TO THE INVENTION

Public safety agencies around the world typically use relatively narrow band, LMR technologies such as P25 to communicate voice information and some data traffic. Characteristics of this technology are long range and high quality voice. Newer non LMR technologies such as LTE are capable of high rate data enabling mobile data applications. This form of technology is relatively short range. In a move to capture the benefit of both technologies, methods of integration are being considered.

LMR networks are generally circuit mode such as P25 (APCO 25), Tetra, DMR (Digital Mobile Radio), or analogue LMR (Land Mobile Radio). Non LMR networks are often packet mode such as LTE (3GPP Long Term Evolution) or Wifi. Older forms of non LMR network may also be circuit mode such as GSM or WCDMA. Non LMR technologies of interest generally involve IP (internet protocol) based networks. Mobile terminals in these networks may be operated by human users or machine users.

Previous methods of managing the behaviour of terminal equipment carried by a user alter the quality of service offered to that user according to the subscription (or payment) made for that service. This applies also to the network behaviour. Examples from the commercial networks might include the allocation of certain data rates or data caps according to the profile of a particular user. These may be fixed policy setting according to a user subscription or may even be dynamic according to specific demand such as wishing to download a particular video quickly. These methods are commonly implemented using a Policy and Charging Resource Function (PCRF) as is the case in an LTE network.

SUMMARY OF THE INVENTION

It is an object of the invention to provide for policy implementation in a system containing multiple wireless networks.

In one aspect the invention resides in a method of policy implementation in a communication system having LMR and IP networks, including: receiving context information from a mobile terminal which is operating in a first one of the networks, using the context information to determine a policy which relates to the terminal in the first network, implementing the policy in the first network in relation to the terminal, determining that the terminal is transferring operation from the first network to the second network, and implementing the policy in the second network in relation to the terminal.

In one instance the first and second networks are respectively the LMR and IP networks, the context may be an emergency, and the policy gives priority to an emergency call by the terminal.

In another aspect the invention resides in a method of policy implementation in a communication system having LMR and IP networks, including: receiving context information from a mobile terminal which is operating in a first one of the networks, using the context information to determine a policy which relates to the terminal in the first network, transferring operation of the terminal from the first network to the second network as a result of the policy.

In one instance the first and second networks are respectively the LMR and IP networks, the context may be reduced battery power, and the IP network requires different power for reliable operation of the terminal.

In a further aspect the invention resides in apparatus for implementing policy in a communication system having LMR and IP networks, including: a context database which receives information relating to the context of mobile terminals operating in the networks, a policy database containing rules relating to the operation of mobile terminals in either network, an event detector which detects a change in the context of a terminal according to information in the context database, and determines any corresponding change of policy according to information in the policy database, and a policy enforcer which implements the corresponding change of policy in either of the networks as required in relation to operation of the terminal.

Policy examples may require the implementation of multiple dynamic rules for operation of the terminal One policy includes maintaining priority of an emergency call when a terminal moves between the LMR and IP networks. Another policy includes transferring operation of a terminal from the LMR network to the IP network when battery power of the terminal runs low.

LIST OF FIGURES

Preferred embodiments of the invention will be described with respect to the accompanying drawings, of which:

FIG. 1 Overview of the architecture for policy driven by user context.

Figure 2:
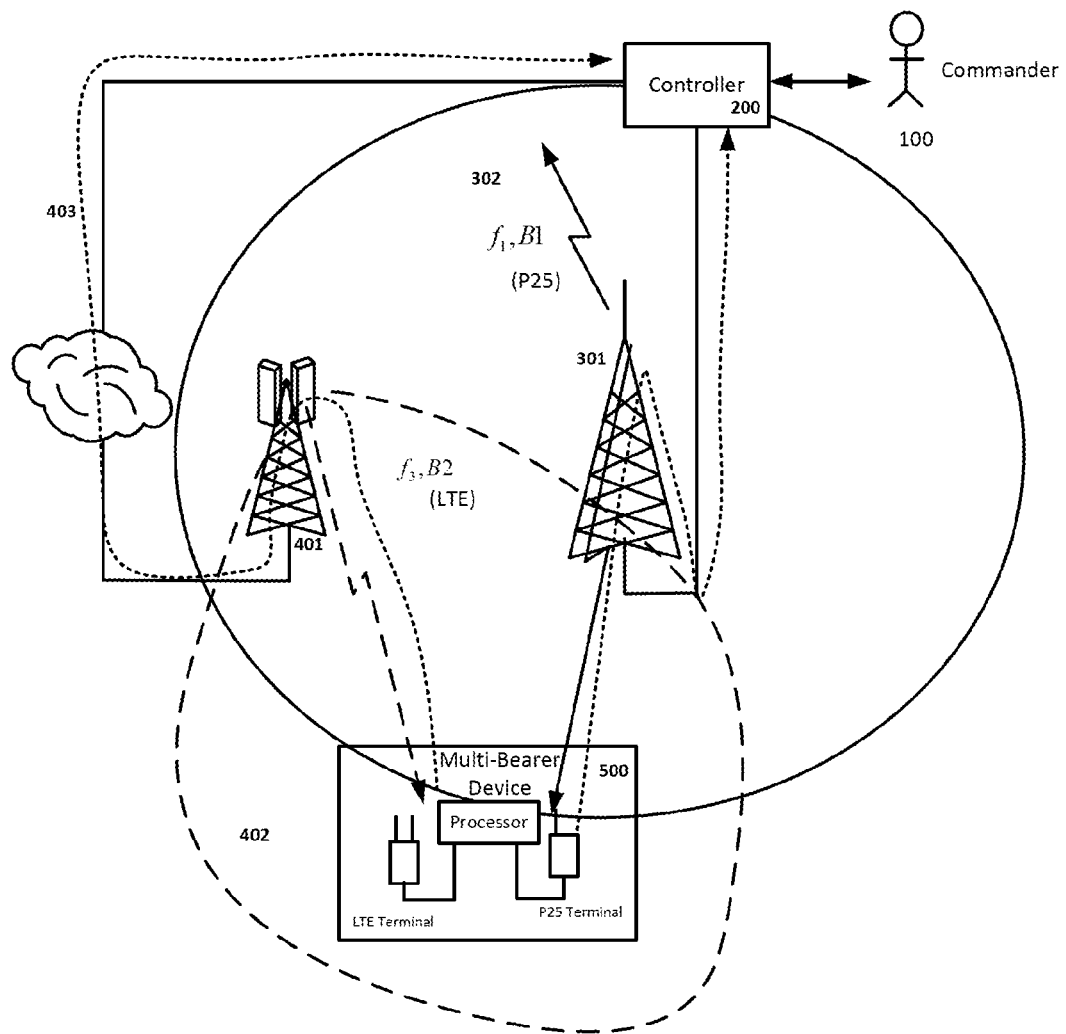

FIG. 2 A system architecture for a mobile system which has policy control

Figure 3:
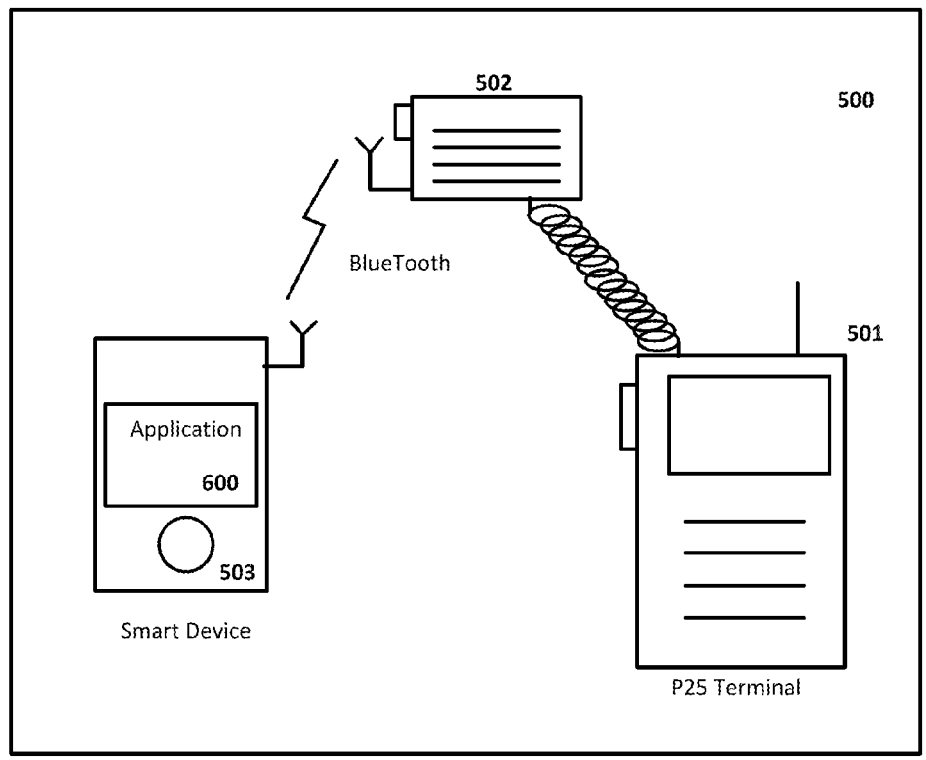

FIG. 3 A terminal system which operates across multiple communications networks.

Figure 4:
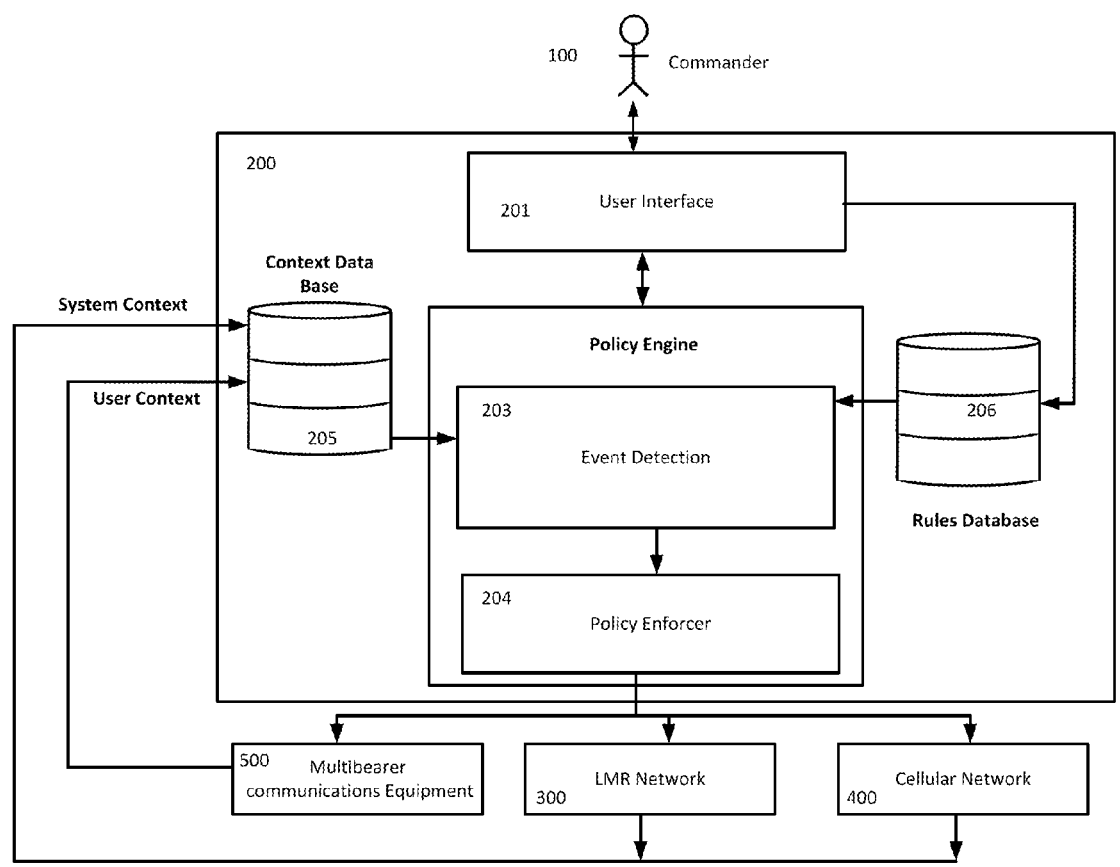

FIG. 4 A system architecture for a policy engine driven by user context.

Figure 5:
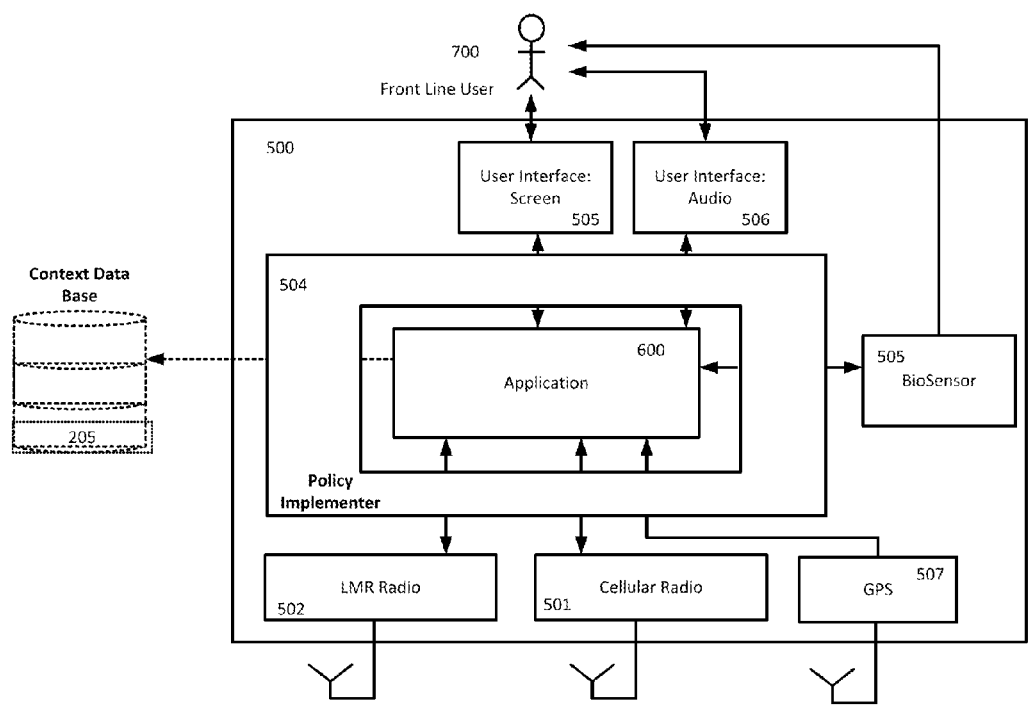

FIG. 5 The terminal application and rules.

Figure 6:
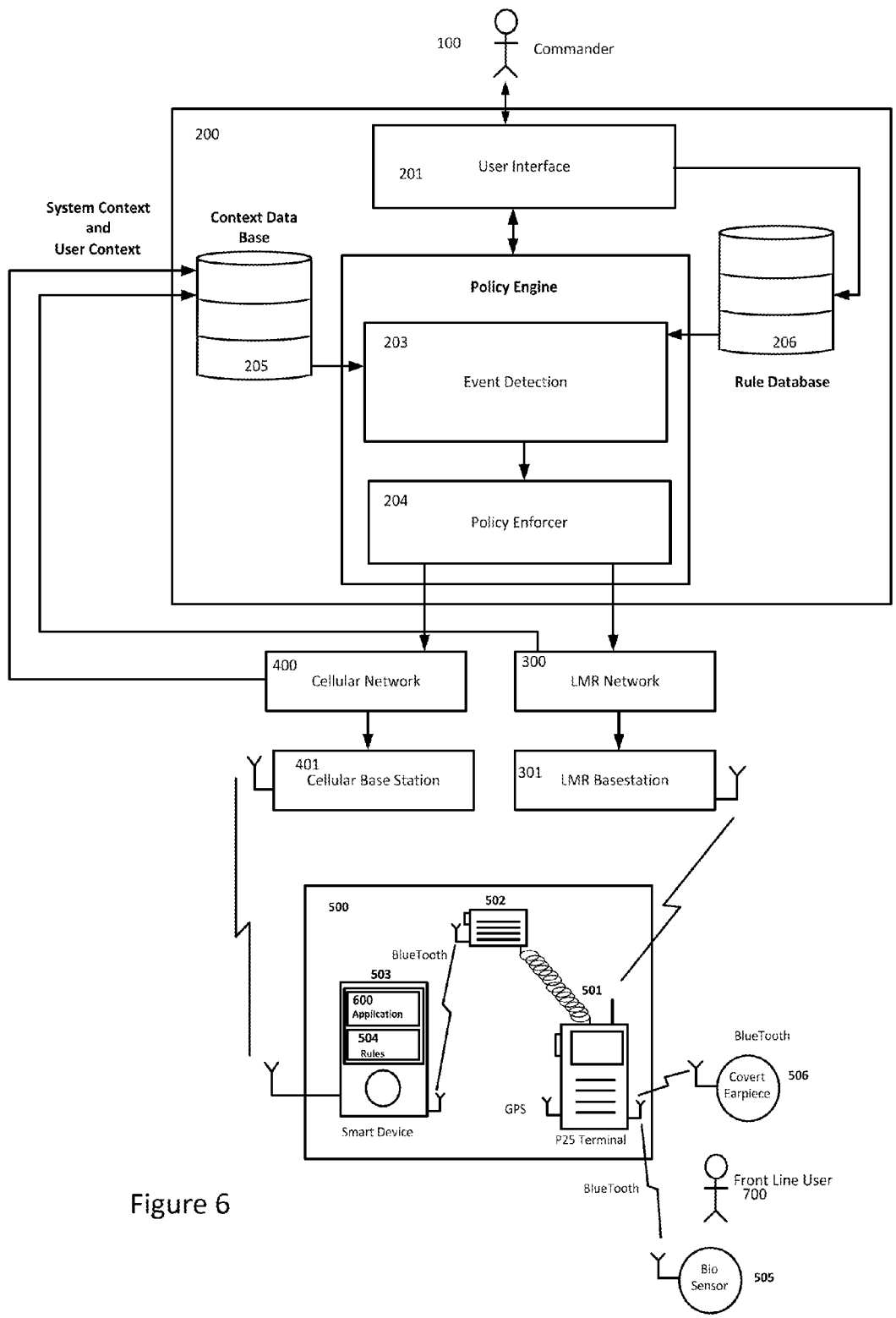

FIG. 6 Full system overview

Figure 7:
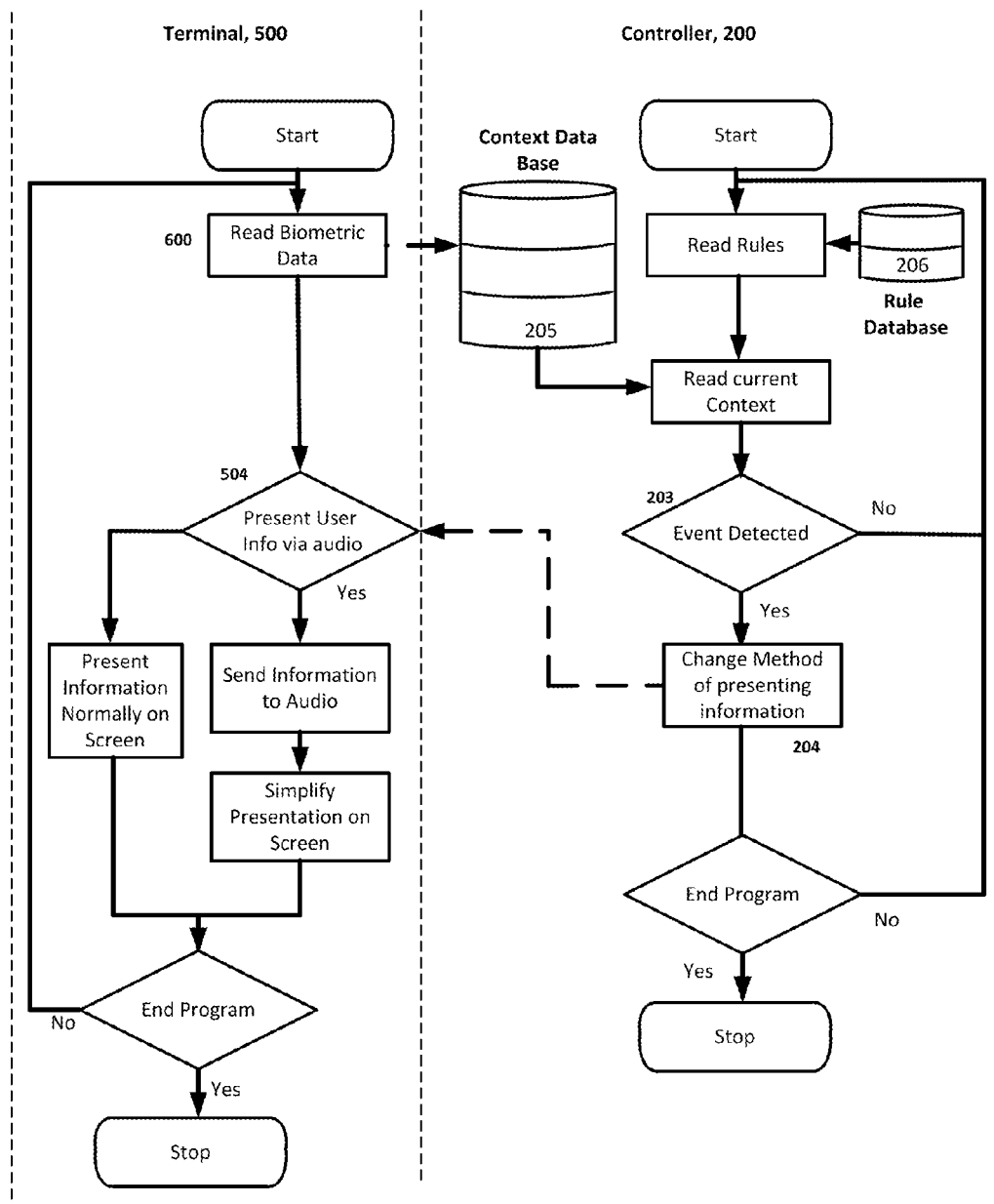

FIG. 7 Flow diagram illustrating a method for changing the presentation of information.

Figure 8:
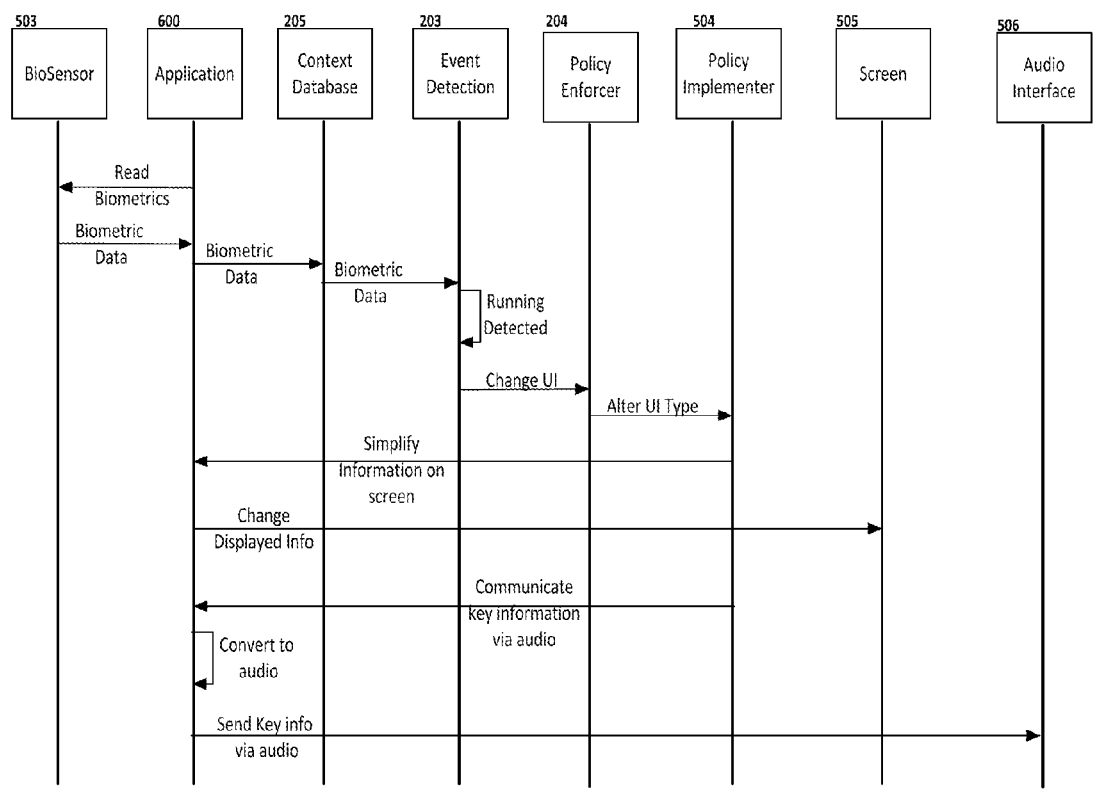

FIG. 8 Sequence diagram illustrating a rule for changing the presentation of information.

Figure 9:
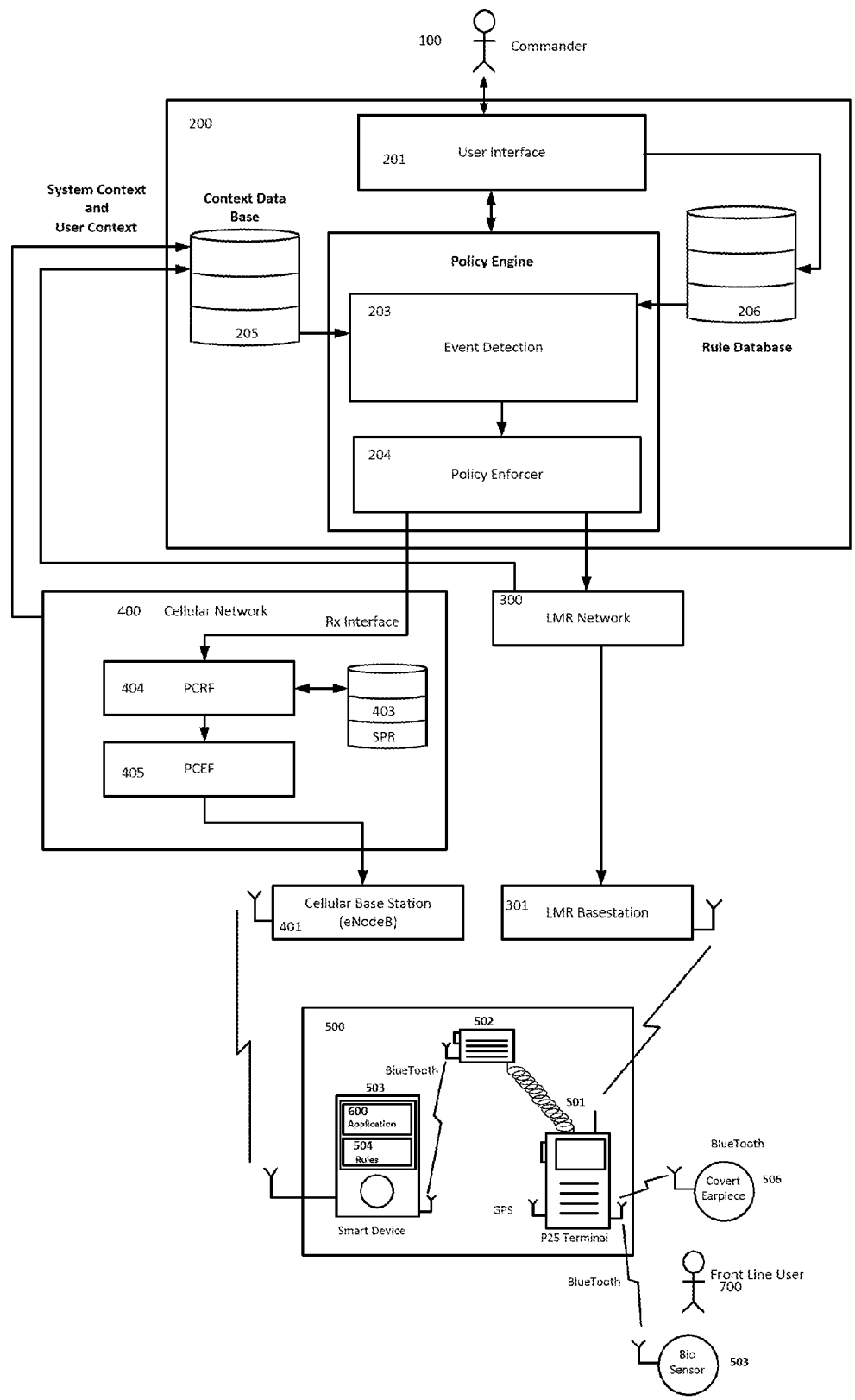

FIG. 9. System diagram illustrating the system in use for priority hand over.

Figure 10:
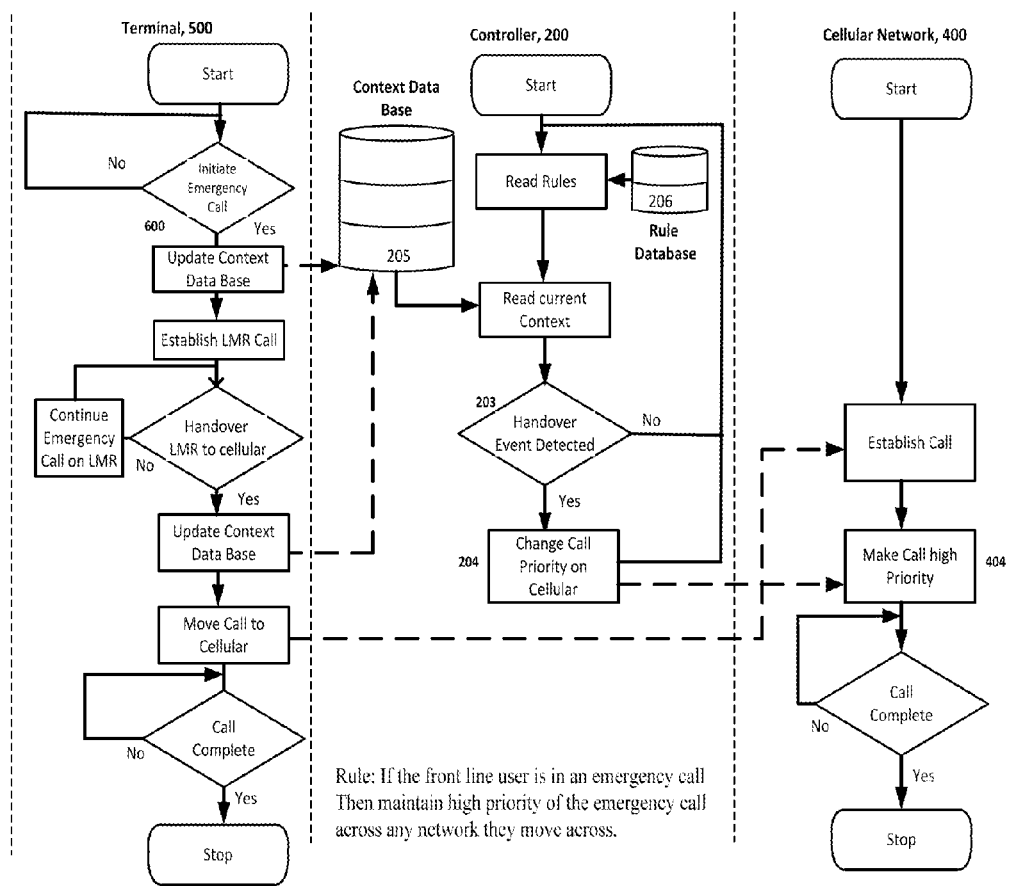

FIG. 10. Flow diagram illustrating system in use for priority hand over.

Figure 11:
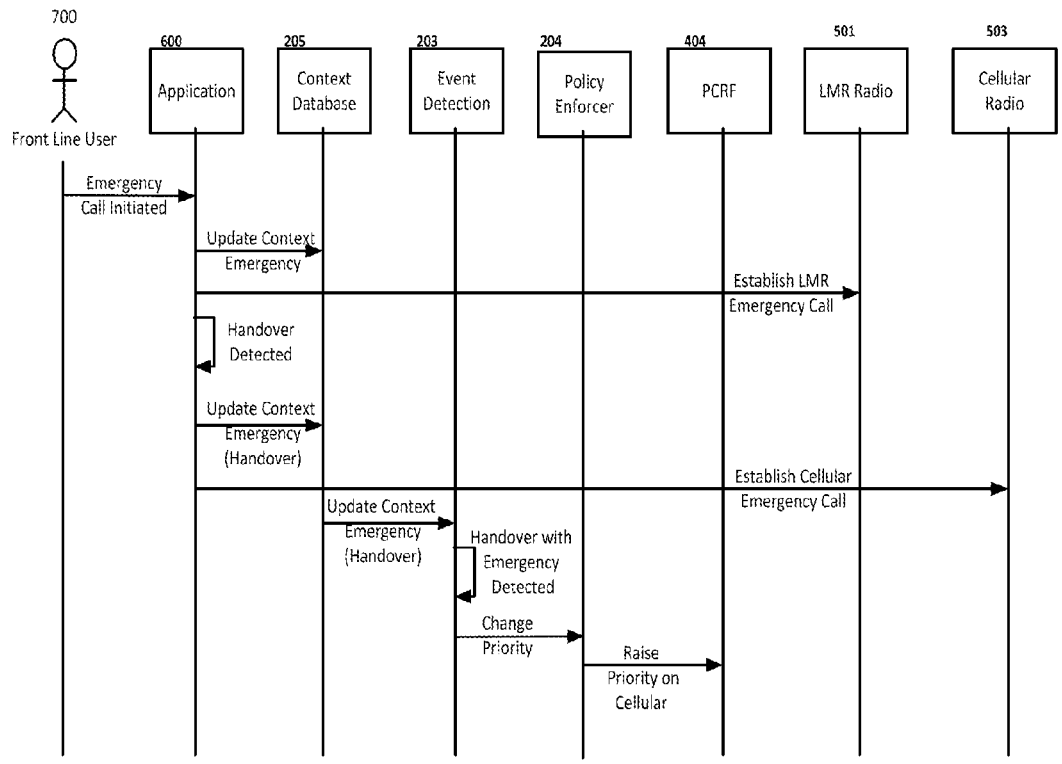

FIG. 11. Sequence diagram illustrating the system in use for priority hand over.

Figure 12:
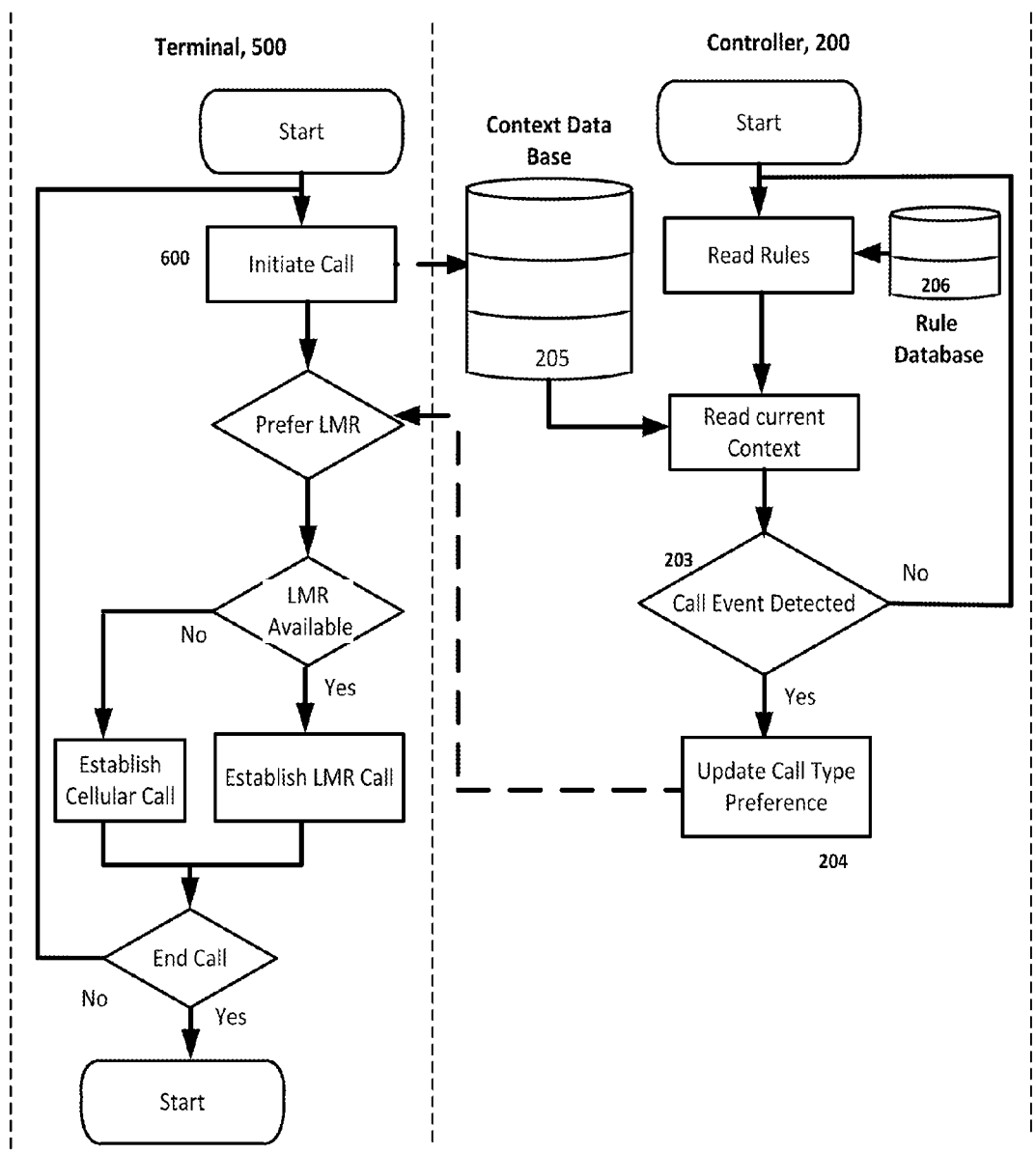

FIG. 12. Flow diagram illustrating managing cost.

Figure 13:
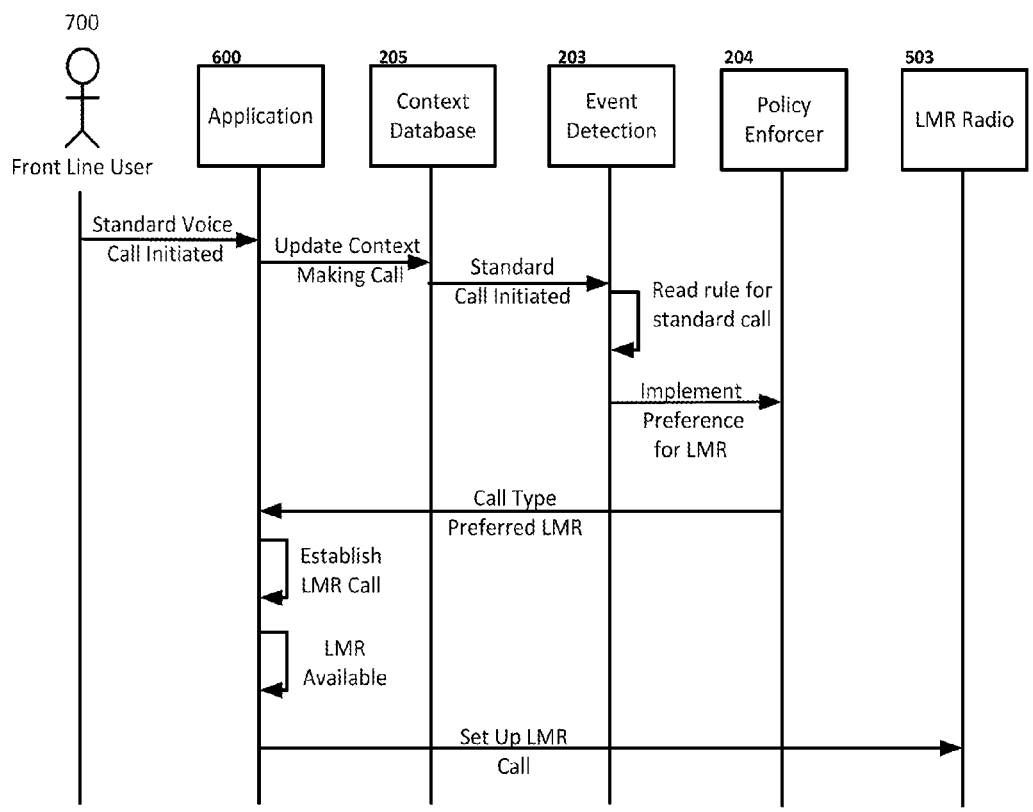

FIG. 13. Sequence diagram illustrating managing cost.

Figure 14:
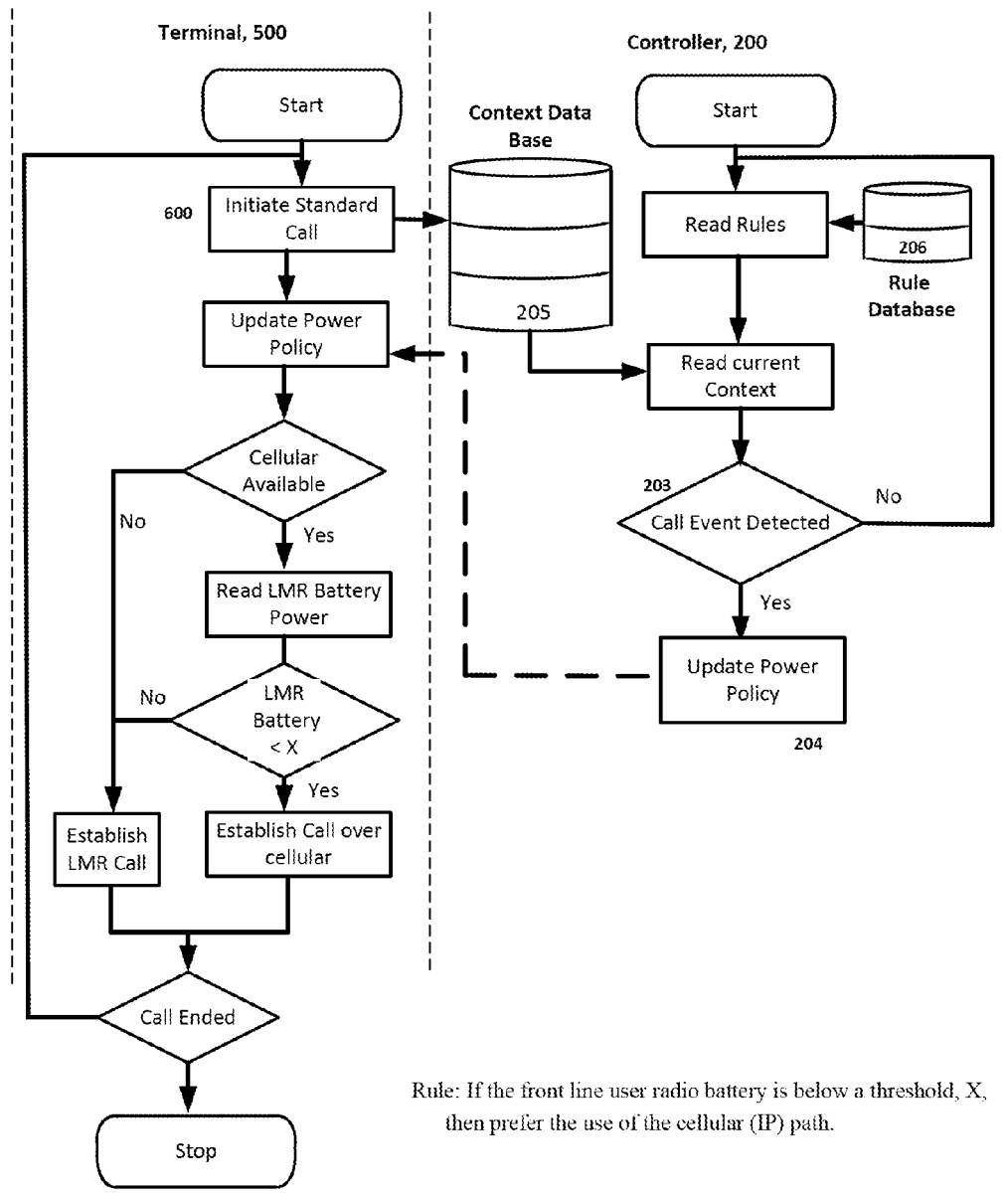

FIG. 14. Flow diagram illustrating managing power.

Figure 15:
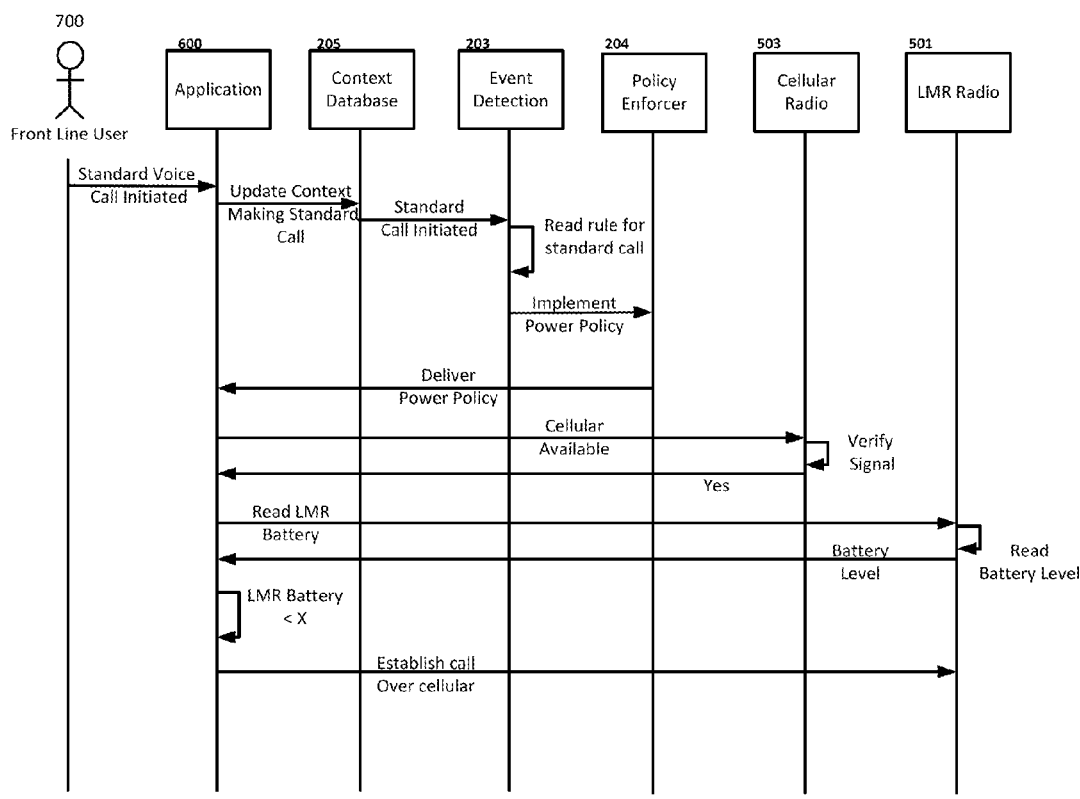

FIG. 15. Sequence diagram illustrating managing power.

Figure 16:
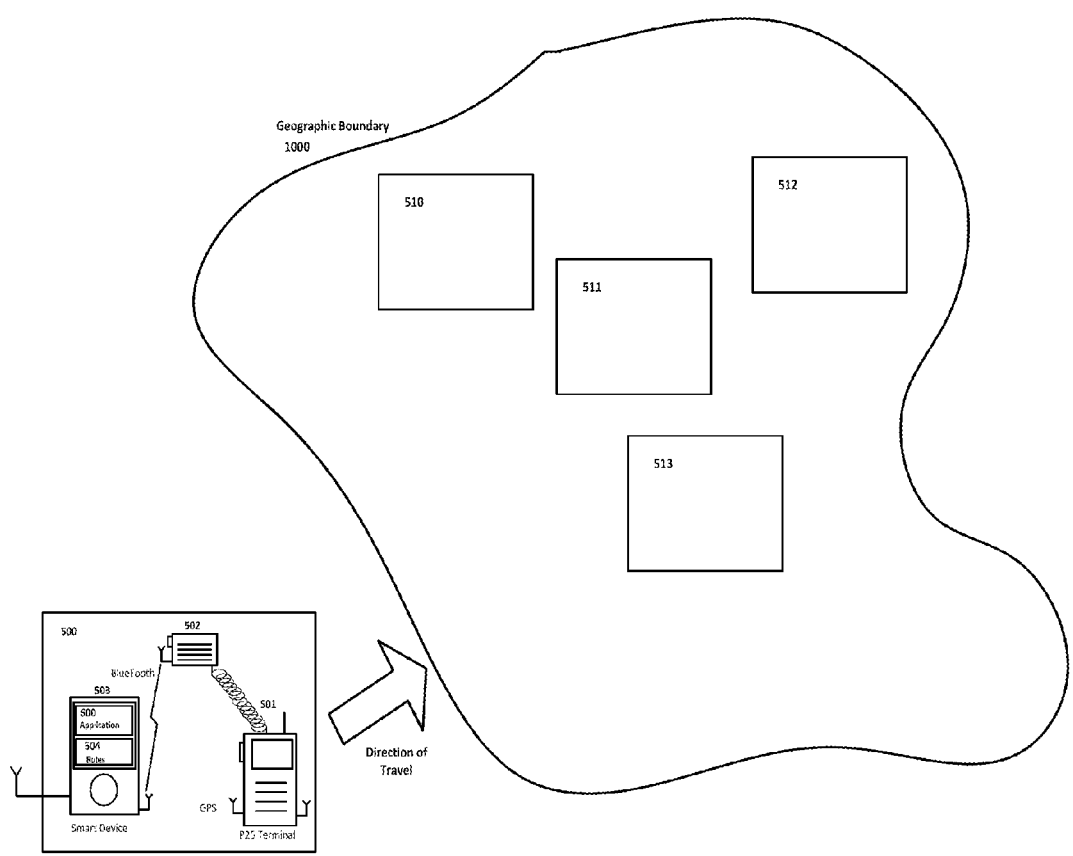

FIG. 16. Illustration to show geographic group.

Figure 17:
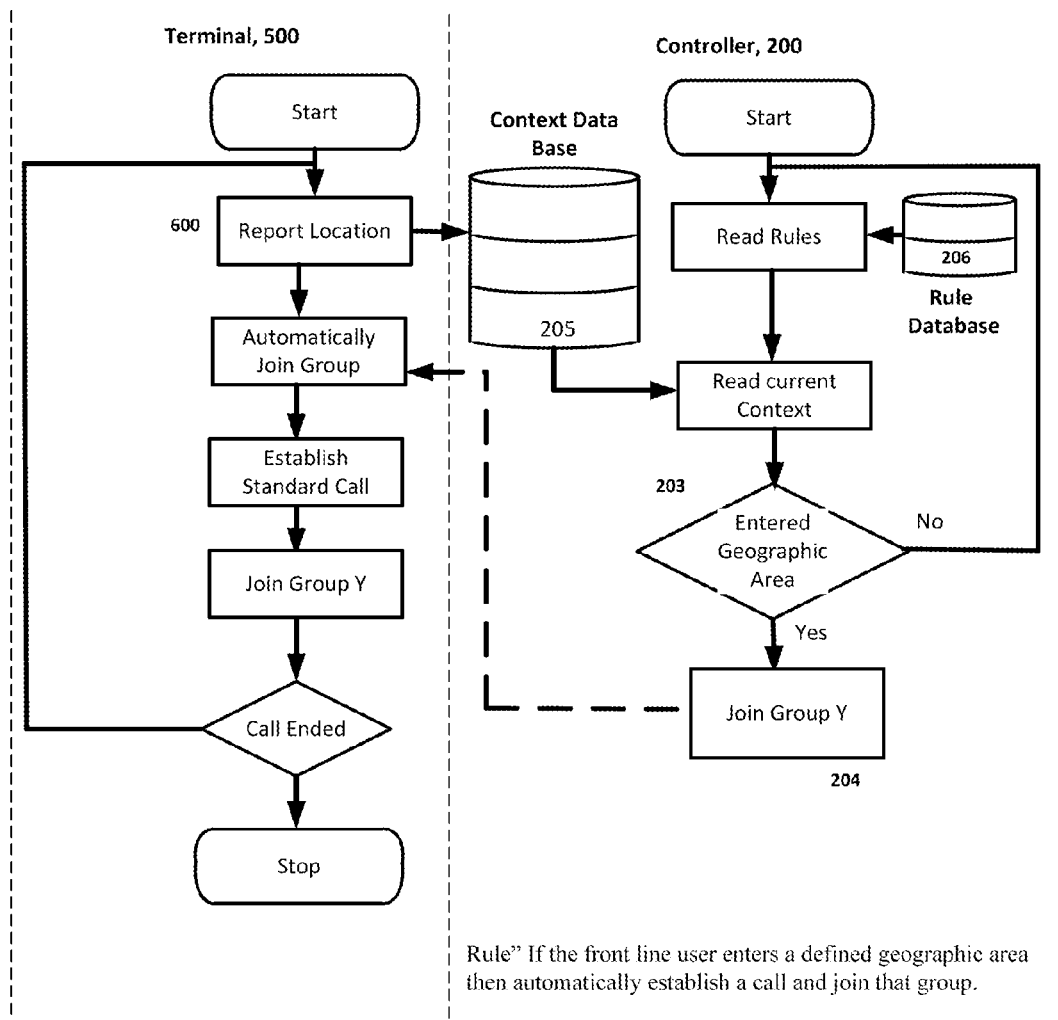

FIG. 17. Flow diagram illustrating geographic group.

Figure 18:
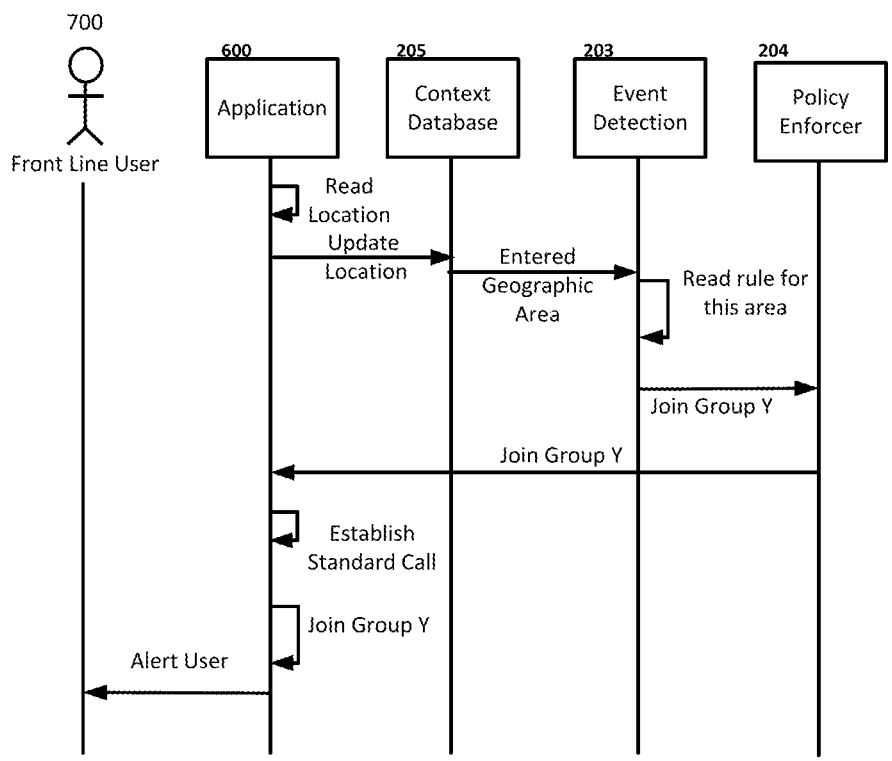

FIG. 18. Sequence diagram illustrating geographic group.

DESCRIPTION OF PREFERRED EMBODIMENTS

Referring to the drawings it will be appreciated the invention may be performed in a variety of ways using a number of computing platforms for implementing a contextual policy engine operating across one or more communication bearers. Further, the bearers across which a contextual policy engine may operate include LTE or generally any wireless bearer capable of supporting IP traffic. It may also operate across LMR channels such as P25 or generally any form of LMR system such as DMR.

FIG. 1 presents an overview of a typical system architecture. A commander 100 can configure the controller unit (policy engine) 200 according to the rules or policies that are relevant to a particular public safety agency. It should be noted that policy engine 200 may be physically located in a back office or may be mobile. The rules or policies defined will be applied to individuals or groups of individuals as appropriate. The Policy Engine operates across one or more communication networks. Preferentially this apparatus is able to operate across one or more LMR networks 300 and one or more cellular networks 400 or more generally any mobile network capable of supporting IP. The communication networks enable connectivity with a communications device that supports multiple communications channels across different protocols such as LTE and P25. This device is carried by a front line user such as a public safety officer.

FIG. 2 illustrates an example communication system over which contextual policy control may operate. In this case, we show a cellular network and an LMR, P25 network. Note that contextual policy can operate over just one bearer path. Cellular communication is afforded through a cellular tower 401 creating a coverage area 402 using a frequency f3 using the communication protocol LTE. The P25 communication is afforded through an LMR communication tower 301 creating a coverage area 302 using a frequency f1 using the communication protocol P25. The details of the cellular architecture are not shown as it is only being used to create an IP pipe between the terminal device and the policy controller at an application layer. A terminal device is also illustrated 500. This device represents a terminal that is capable of operating over both LMR and Cellular networks. The details of this device will be discussed later. Finally, the image highlights an interaction between a commander 100 and the controller (dynamic policy engine) 200. This interaction is used to enable the commander (or person in authority) to configure operationally relevant rules.

FIG. 3 describes one possible realisation of the multi-bearer device 500. In this case a standard P25 terminal 501 is connected to a smart microphone 502 which is acting as a communications hub. The smart microphone connects to a smart device such as a phone or tablet via Bluetooth. This creates a communications pipe from the p25 terminal 501 to the smart device 503. The smart device, 503 has a special application, 600, designed to pair with the smart microphone 502 creating a communications pipe to the P25 terminal 510. The application 600 preferentially process messages from the terminal 501. Clearly the multi-bearer hub 500 can be realised in a number of ways using a number of standard interfaces including WLAN. Other examples might include connecting directly from the P25 terminal 501 via Bluetooth to the smart device 503. Another example may be a mobile station which uses a standard serial port to connect with a suitable processing platform that may be a smart device. All combinations of processing architecture are included as the embodiment of this patent. Such architectures are obvious within the field.

FIG. 4 describes an architecture for the realisation of a policy controller, 200 driven by user context and operating over multiple bearers. A commander, 100 is able to interact with the system via a user interface 201. Through this interface he can configure rules or policies that apply to the front line users or groups of users (identified as 700 in FIG. 1). Focusing on example rules, the commander may enter the following.

1. If the front line user detected to be running (which represents one possible context) then present critical information via an audio interface rather than a local screen.
2. If the front line user is in an emergency call then maintain high priority of the emergency call across any network they move across.
3. If the front line user has access to LMR then for all calls, prefer that communication path.
4. If the front line user radio battery is below a threshold, X, then prefer the use of the cellular (IP) path.
5. If the front line user enters a defined geographic area then automatically establish a call and join a local group.

Numerous other rules can be entered. The rules listed above are given as examples.

Defining rules is one approach to acting upon a policy. An alternative approach is to define the policy broadly and then automatically select rules that apply to that policy.

Example policies may include

Minimise the cost of communications.
  Given a policy like this, a logical selection of rule might be (3) above. In other words to apply the rules that affect the stated policy.
Always keep the officer safe.
  Given a policy like this, rules such as (2) above would apply. Further, one might also apply rule (4) as the reduced range of the radio would make cellular commonly considered the more reliable network.
Any number of policies could be entered. Either rules or policies can be distributed from the policy engine to the terminal devices. In the following text, we describe the distribution of rules. It is important to note however the policies themselves can be distributed to an edge device. It means the interpretation of the policies becomes devolved to the terminal devices as opposed to a central engine.

Once the user in FIG. 4 enters a set of rules, these rules are stored in a rules data base, 206. Separately, another database 205 is recording the current context of the user, eg biometrics. Together, the rules from 206 and the current context of 205 are continually processed in an event detector 203. If the event detector discovers a particular event then action is taken at a policy enforcer 204. If we take an example policy from above, we can break down the areas responsible to implementing a rule. Take for example;

If the front line user is detected to be running then present critical information via an audio interface rather than the local screen.

The rule is held in the data base 206. Biometrics and/or geographic information would be held in the context data base. This information can be used to detect if the user is running and this is detected in the event detector 203. Finally, action is taken by the policy enforcer 204. In this case the policy enforcer would instruct the multi-bearer communications equipment 500 to alter the way in which information is presented.

Finally in FIG. 4 we show the cellular network 400 and the LMR network 300. These communication pipes are both used to deliver information to the multi-bearer equipment and can also have their behaviour altered. A contextual based policy system as described herein can also be operated over a single network.

FIG. 5 shows one possible realisation of the terminal device. A front line user 700 interacts with the terminal equipment 500 via user interfaces 505 and 506. The image also shows a biosensor 503 which is used to monitor heart rate, posture and body temperature. This data is used to represent local user context. Other context can be extracted from the wider network though here we describe examples. The figure shows an application 600 which is a software implementation running locally and responsible for sending all context information to the context database 205. The data base is not physically a part of the terminal device hence it is shown as dashed. The application 600 is sending contextual information via any available bearer to populate the context data base.

FIG. 5 also highlights the presence of an LMR radio 502 and a cellular radio 501. These units represent the communications bearers for this example. The status of these bearers also represents context e.g available or not, cost of use etc. Finally in this example, a global positioning unit is shown 507. Location can also represent context. Surrounding the application is a software layer that implements rules or policy 504. The rules may be entered by a commander. At the terminal end is a function that receives instructions that represent a change of behaviour. This change of behaviour is implemented by the policy implementer 504. Examples of a policy implementation might be the use of bearer types, the method of presentation of information, which information to capture, and so on.

It should be noted that FIG. 4 identifies the policy enforcer 204. In an alternative form of the apparatus, the policy enforcer could be located at the terminal end 500.

FIG. 6 illustrates the whole system in one image. The image highlights the flow of control from the commander, 100 down to the user or group of users, 700. With reference to FIG. 4, we described how a commander could enter rules that are dependent upon context. FIG. 5 described the application of these rules in a user terminal FIG. 6 highlights a physical architecture related to the communication elements. The cellular network uses one or more cellular base stations 401 to create a wireless link to the terminal equipment 500. Further, the LMR network uses one or more LMR base stations 301 to also communicate with the terminal equipment.

FIG. 6 highlights how in this example the terminal equipment is made up of an LMR radio 501 and a cellular radio 503. These are interconnected by a smart microphone 502. In this case the smart microphone 502 represents a bridge between a cellular platform and an LMR platform. This bridge can be established in a number of ways including directly. The LMR equipment 501 also has a number of accessories connected in that it has a Bluetooth microphone 506 and a Biosensor 505. Both these are used as media for communicating with the front line officer 700. The LMR terminal also has GPS. The cellular radio 503 contains an application 600 and a unit 504 for implementing rules.

FIG. 7 shows a flow diagram illustrating process for the rule "If the front line user is detected to be running then present critical information via an audio interface rather than a screen". The application 600 is running on the smart device 503. The application 600 is periodically reading the biometric data from the sensor 505 (see FIG. 6) where the information is passed through the radio 501, through the smart accessory 502 and arrives at the smart device 503. The application 600 sends the biometric information to the context data base 205 in the controller 200. The controller is constantly reading rules from a rules data base 206 and checking this against the current context of the user. An event detector 203 is cross checking the context versus to rules to detect events. If no events have occurred then the cycle simply starts again. If however an event is detected, in this case the user is running then the policy enforcer 204 will initiate an action. In this case the action to be taken is to inform the application 600 to change the way it is presenting information. This action is communicated to the policy implementer 504 that affects the operation of the application 600. The application is constantly checking the way in which information should be presented. If presentation is normal then information is displayed on the screen of the smart device as normal text. If presentation needs to change because the user is running then the key information is communicated via an audio ear piece, 504. Key information may also be presented in large font on the smart device.

FIG. 8 describes a sequence through the flow diagram of FIG. 7. The application, 600 reads current biometrics data from the bio sensor 505. This biometrics data includes heart rate, posture and activity level. Activity level describes the level of movement of the person. Further, the application 600 may also read the location from the GPS receiver which forms part of the LMR terminal 501. This biometrics information is fed to the context data base 205. A processing unit 203 is constantly monitoring for relevant contextual events. Events to be detected are held in the rules data base 206 and the event detector 203 is constantly cross checking for these events. In this case, the biometrics information indicates the user is running. In this scenario, presenting textual or even visual information via a smart device screen is less effective. As such the policy enforcer instructs the application 600 to change its presentation. This is facilitated through instructions being sent from the policy enforcer 204 to the policy implementer 504 on the smart device 503. The policy implementer instructs the application 600 to change the way it presents information.

Specifically in this example, one result is that only the key information (which may change according to different contexts) is shown on the smart device screen and possibly different key information is converted to audio and presented to the user via the audio interface 506. In other words for this example the outcome is that as a result of this context change the key information is altered in content (was complex smart phone screen and now simple audio) and destination (was complex smartphone screen and now simple audio and simple text). The end user is presented with information in formats that will vary according to both local situation and wider context changes but which are intended by policy, to maximise the chance it can be absorbed accurately and efficiently by the end user.

FIG. 9 expands upon FIG. 6 to show some more detail within the cellular network. Here, we shall use this figure to describe how the following rule can be implemented "If the front line user is in an emergency call then maintain high priority of the emergency call across any network they move across".

FIG. 9 highlights some key components of a cellular network, notably the Policy and Charging Resource Function (PCRF) 404 and the Policy and Charging Enforcement Function (PCEF) 403. These components represent parts of the standard LTE architecture. These elements are highlighted as these components manage the rules relating to the priority of a call and the enforcement of these rules. Standard interfaces to the PCRF have been defined by 3GPP, one of these is called Rx. which enables an external entity to take action on contextual policy, in this case to change rules such a priority. Here we highlight how the policy enforcer 204 which forms part of the architecture of the policy controller 200 has access to the Rx interface to the PCRF 404.

FIG. 10 illustrates a flow diagram to implement the functionality described above. The application 600 is running on the smart device 503 which forms part of the terminal system 500. Here we focus solely on an emergency call and to begin the application is monitoring for the start of an emergency call. If an emergency call is initiated then the current user context is updated to the context database 205. Further, we shall assume an LMR emergency call is initiated immediately. Following this, the application is monitoring whether or not a handover to cellular may be required. If a handover is required then the context data base 205 is updated before a cellular call is initiated.

FIG. 10 highlights how the controller 200 is monitoring for events related to emergency calls and events related to handover. If a handover situation is detected by the policy enforcer 203 then the priority of the cellular call is raised through messaging via the Rx interface to cellular network PCRF 404. That priority remains high until the emergency call is over.

FIG. 11 details one sequence through the flow diagram of FIG. 10. Upon the front line user 700 initiating an emergency call, the application 600 updates the context data base 205. In parallel, the controller 200 is constantly monitoring for contextually relevant rules stored in a rules data base 206. If the event detector 203 detects a context change according to the rules then it will take action. In this case it is searching for a handover to cellular. The application detects a handover situation and reports this change of context to the context data base 205. The event detector 203 detects this situation. Given the context, the policy enforcer, 204 takes action. The action required is to raise the priority of the call on the cellular network. This is facilitated through sending a message via the Rx interface to the PRCF, 404 on the cellular network.

FIG. 12 illustrates how the following rule can be implemented "If the front line user has access to LMR then for all calls, prefer that communication path". Here, we focus on the case where the front line user 700, is seeking to establish a standard call. Upon the user 700 initiating a standard call, the application, 600 updates the context data base 205. Given the initiation of a call, the controller, 200 reads the current rules from the rules data base 206, for this user or group of users and establishes the preferred call method. These rules are delivered to the application 600. Equipped with the rules, the application 600 uses the rules to set up a call. In this case, the preference is to always use LMR. Given this preference, an LMR call is established.

FIG. 13 shows a sequence through the flow diagram of FIG. 12. The front line user 700 initiates a standard call. The application 600, updates the context data base 205. The event detector 203 detects that a standard call has been initiated, reads the rules from the rules data base and instructs the policy enforcer 204 to take action. That action is to instruct the application 600 (via the policy implementer 504) to prefer an LMR call. If LMR is available then an LMR call is initiated.

FIG. 14 illustrates a flow diagram for implementing the following rule, "If the front line user radio battery is below a threshold, X, then prefer the use of the cellular (IP) path". Upon the user, 700 initiating a standard call, the application 600 updates the context data base 205. In parallel the controller 200, reads the rules for a standard call from the rules data base 206. The event detector 203 detects that a standard call has been initiated and instructs the policy enforcer 204 to take action. In this case the action to take is the rule which manages power usage. The policy enforcer 204 communicates this rule to the policy implementer 504. Now the application 600 checks to see if cellular is available. It is not then an LMR call is initiated. If LMR is available then the LMR battery power is checked. This battery level may also be available in the context data base. If the battery LMR battery level is less than a threshold X then a cellular call is established. Otherwise an LMR call is created.

FIG. 15 illustrates a sequence through the flow diagram of FIG. 14. The user initiates a standard call. The application 600 updates the context database 205 to reflect that a call has been initiated. This event is detected by the event detector 203 which reads the current rules for a standard call. In this case a rule exists related to power management. This rule is passed to the policy enforcer 204 which delivers the rule to the policy implementer 504. That causes the application to firstly verify if cellular is available. If it is not then an LMR call is started. If cellular is available then the application 600 reads the current battery level of the LMR radio 501. If the battery level is less than a threshold X then a cellular call is preferred to save LMR battery power.

FIG. 16 illustrates a multi-bearer terminal 500 that is moving in a certain direction. The terminal 500 is about to enter a predefined geographic area 1000. Within this area already are a number of other terminal devices 510, 511, 512,513 that are operating in a group. A rule exists that in this geographic area, all users automatically join group Y. Specifically the rule is "If the front line user enters a defined geographic area then automatically establish a call and join that group."

FIG. 17 a flow diagram for implementing the rule above. The application 600 is periodically reading the local GPS location and updating the context data base 205. Upon entering the geographic area 1000 the user 700 needs to join group Y. The controller 200 reads the rules for location from the rules data base 206. The event detector 203 detects the location and instructs the policy enforcer 204 to take action. In this case the action to take is to force the terminal 500 to join group Y. The policy enforcer 204 communicates this rule to the policy implementer 504 so now the application, 600 initiates an LMR call and joins group Y. The user 700 is alerted.

FIG. 18 illustrates a sequence through the flow diagram of FIG. 17. The application 600 is periodically updating the context database 205. The event detector 203 reads the current rules for location from the rules data base 206 and detects the event that user 700 has entered a location 1000. The policy enforcer 204 informs the policy implementer 504 what action to take. That results in the application establishing an LMR call and joining group Y.

The invention claimed is:

1. A method of operation a policy controller in a communication system having Land Mobile Radio (LMR) and Internet Protocol (IP) networks, comprising:

receiving context information from a mobile terminal which is operating in a first one of the networks;

using the context information to determine a policy which relates to the terminal in the first network;

implementing the policy in the first network in relation to the terminal;

determining that the terminal is transferring operation from the first network to the second network; and maintaining the policy by the policy controller in the second network in relation to the terminal, once the terminal has transferred to the second network;

wherein the first and second networks are respectively the LMR and IP networks, the context is an emergency, and the policy gives priority to an emergency call by the terminal.

2. A method according to claim 1 wherein the second network has an existing policy or rules system and the maintaining the policy in the second network includes changing existing policy or rules in the existing system.

3. A method of policy implementation in a communication system having Land Mobile Radio (LMR) and Internet Protocol (IP) networks, including:

receiving context information from a mobile terminal which is operating in a first one of the networks, using the context information to determine a policy which relates to the terminal in the first network, transferring operation of the terminal from the first network to the second network as a result of the policy, and maintaining the policy in the second network once operation of the terminal has been transferred;

wherein the first and second networks are respectively the IP and LMR networks, and the policy is force joining of a group base on geographical location.

4. A method according to claim 3 wherein the first and second networks are respectively the LMR and IP networks, the context is reduced battery power, and the IP network requires less power for operation of the terminal.

5. A method according to claim 3 wherein the second network has an existing policy or rules system and the maintaining the policy in the second network includes changing existing policy or rules in the existing system.

6. A policy controller for implementing policy in a communication system having Land Mobile Radio (LMR) and Internet Protocol (IP) networks, including:

a context database which receives information relating to the context of mobile terminals operating in the networks, a policy database containing rules relating to the operation of mobile terminals in either network, an event detector which detects a change in the context of a terminal according to information in the context database, and determines any corresponding change of policy according to information in the policy database, and a policy enforcer which implements the corresponding change of policy in either of the networks as required in relation to operation of the terminal, and maintains the change of policy when the terminal transfers between networks, wherein the first and second networks are respectively the IP and LMR networks, and the policy is force joining of a group base on geographical location.

7. A controller according to claim 6 wherein a policy requires the implementation of multiple rules for operation of the terminal.

8. A controller according to claim 6 wherein one policy includes maintaining priority of an emergency call when a terminal moves between the LMR and IP networks.

9. A controller according to claim 6 wherein one policy includes transferring operation of a terminal from the LMR network to the IP network when battery power of the terminal runs low.

10. A controller according to claim 6 wherein one policy includes forced joining of an LMR group based on geographical location.

11. A controller according to claim 6 wherein the second network has an existing policy or rules system and the maintaining the policy in the second network includes changing existing policy or rules in the existing system.

* * * * *